United States Patent [19]
DeAngelis

[11] 3,901,465
[45] Aug. 26, 1975

[54] VARIABLE-AREA VARIABLE INCIDENCE WING AND AIRCRAFT INCORPORATING SAME

[76] Inventor: Lawrence J. DeAngelis, 9101 Ballard Ln., Clinton, Md. 20735

[22] Filed: Mar. 5, 1974

[21] Appl. No.: 448,203

[52] U.S. Cl. .................................. 244/48
[51] Int. Cl.² ............................. B64C 3/48
[58] Field of Search ........ 244/48, 43, 44, 46, 100 R

[56] References Cited
UNITED STATES PATENTS

| | | | |
|---|---|---|---|
| 1,530,232 | 3/1925 | Buttner | 244/48 |
| 1,903,752 | 4/1933 | Belizzi | 244/48 |
| 2,623,712 | 12/1952 | Spratt | 244/48 |
| 3,190,583 | 6/1965 | Stoppe | 244/48 |

FOREIGN PATENTS OR APPLICATIONS
979,500   4/1951   France .................. 244/48

*Primary Examiner*—Trygve M. Blix
*Assistant Examiner*—Paul E. Sauberer
*Attorney, Agent, or Firm*—Low and Matthews

[57] ABSTRACT

A variable incidence wing which increases the effective central span wing area as the angle of incidence increases. The juncture between the wing and fuselage remains enclosed at all incidence angles, or optionally is opened and vented whereby no disruptive air flow occurs in either condition. A pusher aircraft especially adapted to utilize variable incidence wing construction, having favorable low speed take off and landing characteristics.

9 Claims, 9 Drawing Figures

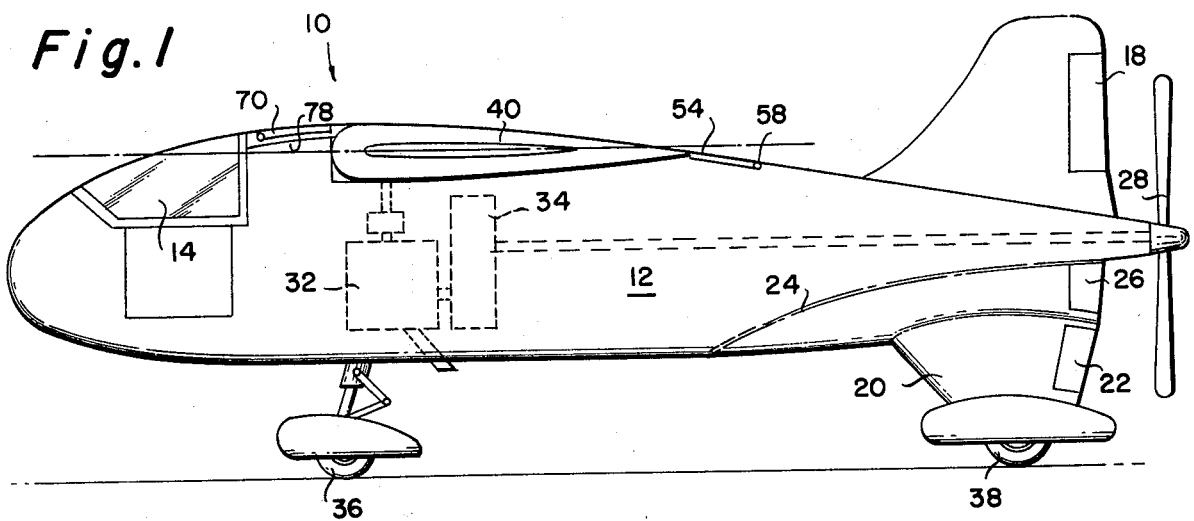
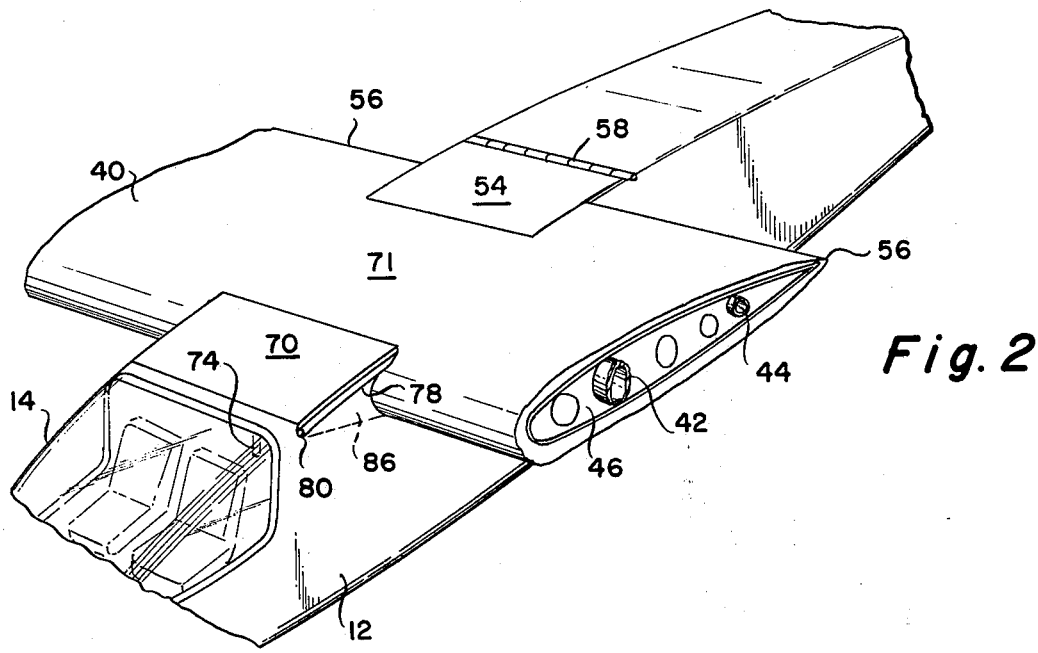
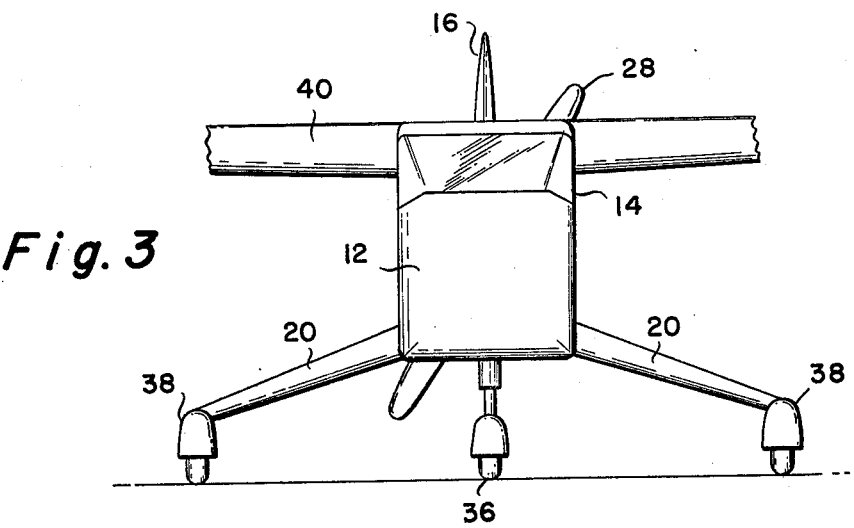

VARIABLE-AREA VARIABLE INCIDENCE WING AND AIRCRAFT INCORPORATING SAME

BACKGROUND OF THE INVENTION

Many patentees have sought to improve aircraft characteristics especially during critical near-stall low-speed operations such as landing and take-off by means of diverse variable incidence wing devices. Typical of numerous prior art attempts are the U.S. Pat. Nos. to Hilmy 2,141,984; Stoppe 3,190,583; Millam 2,912,191; and Belizzi 1,903,752. In many instances wing incidence is varied simply by rotation of a wing about the main spar, or, only a portion of the wing is altered in angle or configuration.

Such efforts have found their way into diverse experimental and prototype aircraft, typified by the four-engine XC–142, V/STOL aircraft, the Corsair A–7A light attack bomber, or the Kaman K–16B V/STOL modified Grumman Goose.

In addition to various tilt-wing arrangements, diverse boundary layer control devices have been tested including Handley-Page leading edge slots or those on the full-span high-wing Curtiss XSBC–1, for example, wherein the slot extends fully across the central wing span over the fuselage.

These structures have been of necessity complex in nature and difficult to fabricate, and especially in the case of "rotary spar" constructions, have lost any airfoil advantage provided by the fuselage area between the extended wing portions.

BRIEF SUMMARY OF THE INVENTION

The present invention provides a variable-incidence, variable-area wing and aircraft construction utilizing auxiliary panels associated with the fuselage to effectively increase the top airfoil surface of the wing central span as the angle of incidence is increased, thereby improving lift and generally enhancing low-speed aircraft handling characteristics, as is especially desirable during landing and takeoff operations.

The disclosed construction is characterized by relative simplicity while providing a wing central portion which (1) permits variable wing incidence, (2) provides a variable length upper airfoil at the central span, and, (3) causes no significant airflow disruption at the wing root area adjacent the fuselage as the wing and fuselage move relative to one another.

Further, this unique wing-fuselage arrangement is incorporated to advantage in an aircraft characterized by an efficient pusher propeller configuration and stabilizer-supported landing gear.

As a consequence of the aircraft configuration, forward and downward visibility for pilot and passengers is desirably maximized. Further, not only is useful visibility increased, but also the variable incidence wing permits the desired increase in angle of attack as upon landing and without elevating the aircraft nose angle, thereby providing the pilot an unobstructed view of the airstrip coupled with improved depth perception or ability to gauge height as airspeed bleeds off at minimum height and as the aircraft settles in a fuselage-level attitude to a landing.

Like advantages are achieved on takeoff, as the aircraft is enabled to break ground while in a substantially fuselage-level attitude.

DESCRIPTION OF THE DRAWINGS

FIG. 1 is a side elevation of an aircraft embodying the features of the invention;

FIG. 2 is a fragmentary perspective view of the aircraft of FIG. 1, showing the fuselage area at the juncture thereof with the wing;

FIG. 3 is a front elevational view, partly fragmentary, of the aircraft;

DESCRIPTION OF THE DISCLOSED EMBODIMENT

Figure 4:
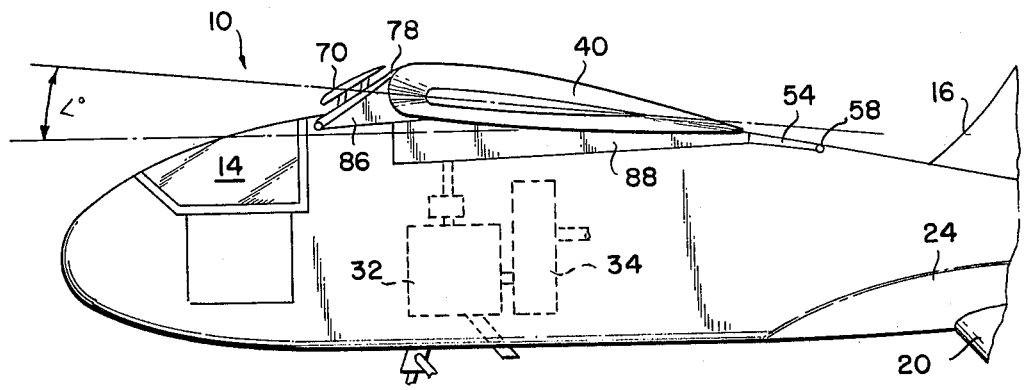
FIG. 4 is a fragmentary side elevation of the aircraft with the wing angle of incidence increased.
Figure 5:
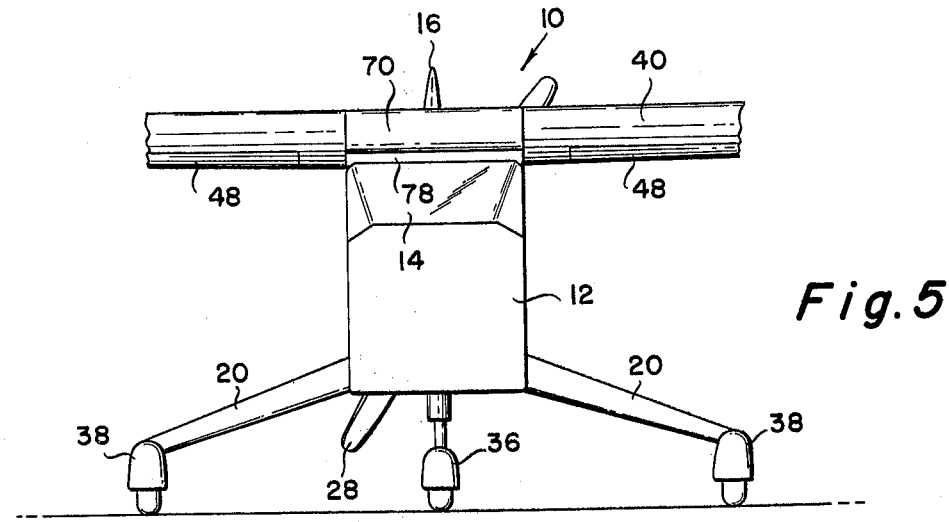
FIG. 5 is a fragmentary front elevational view of the aircraft of FIG. 4.

Referring to the drawings, the aircraft 10 shown therein incorporates and uses to advantage the subject invention. Aircraft 10 includes a fuselage 12 having a cockpit area 14, vertical stabilizer 16 and rudder 18, and an anhedral or negative dihedral stabilizer 20 and elevator 22 thereon. In the aircraft of the disclosed embodiment, anhedral stabilizer extends from a narrowed portion of fuselage 12 which serves as an auxiliary vertical stabilizer 24 and rudder 26.

The aircraft is propelled by a pusher propeller 28 driven by a suitable engine generally indicated at 32 through reduction gearing and suitable shafting as at 34.

In the illustrative aircraft, engine 32 may be mounted upon a suitable firewall 50, with appropriate ducting to the exterior of the fuselage for cooling and exhaust, as is known in the art.

The aircraft 10 is ground-supported by tricycle landing gear which may be provided with usual speed fairings, and includes a generally conventional nosewheel or forward landing gear 36, and a pair of rear landing wheels at 38. The rear wheels 38, 38 are uniquely supported at and upon the ends of anhedral stabilizer 20.

Lift is provided by wing 40 mounted in high-wing position and which is preferably of suitable cantilever construction thereby to obviate the need for external wing struts.

Wing 40 is essentially conventional overall construction and thus may include a main transverse spar 42 shown as a cylindrical tube, but which may comprise a box beam or other well known form. An auxiliary trailing spar 44 may be present, the spars conventionally supporting a plurality of supporting ribs at 46 having a desired airfoil configuration. The wing may be covered conventionally in sheet aluminum riveted or otherwise bonded to the ribs and supporting structures. Suitable conventional ailerons (not shown) and flaps at 48 may be provided.

The aircraft 10 is thus essentially conventional in operating components and usual control surfaces, and the pusher mounting of propeller 28 enhances the efficiency thereof in eliminating propwash losses against and along the fuselage as encountered with nose-mounted propellers.

The pusher propeller arrangement and the unique mounting of the landing gear on the stabilizer 20 are especially desirable in connection with the variable incidence mounting of the wing 40 now to be described.

As clearly seen in FIG. 1, the upper airfoil surface of the wing 40 is smoothly faired into the upper fuselage when the wing is in retracted or cruise position and with the wing recessed into the fuselage central section seat upon suitably contoured surfaces in the fuselage associated with transverse bulkheads as at 50, 52, for example. The arcuate line of seating is generally indicated in dashed lines at 53, FIG. 7. The bulkhead 50 may be especially rigid and serve as the firewall mount for engine 32.

On the exterior surface of the wing central section, a relatively heavy and rigid panel at 54 is secured to the wing rib and spar structure and extends along the fuselage aft of the wing trailing edge 56 to a pivot connection with the fuselage at 58 as by a transverse piano hinge. This major hinge structure is secured for rigidity to the fuselage, such as to a transverse bulkhead 60 (FIG. 6) within the fuselage.

Internally of the fuselage, main wing spar 42 is provided with a pair of transversely spaced support and incidence-varying means 62, shown as jack screws 66, but which may comprise fluid cylinders or the like devices. The jack screws shown provide the advantage of relative simplicity, capability of manual operation if necessary, as by means of a hand crank, as well as positive incremental control of the incidence angle desired.

Figure 6:
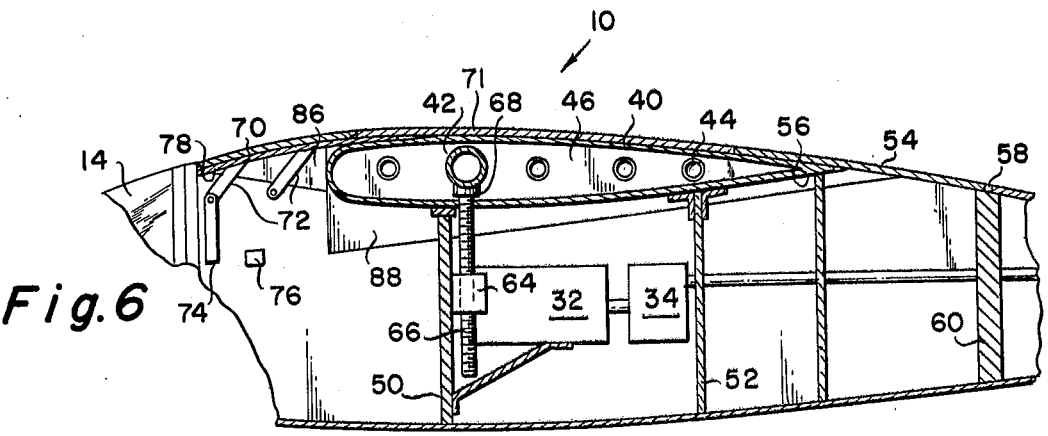
FIG. 6 is a fragmentary side sectional view of the wing-fuselage area.
Figure 7:
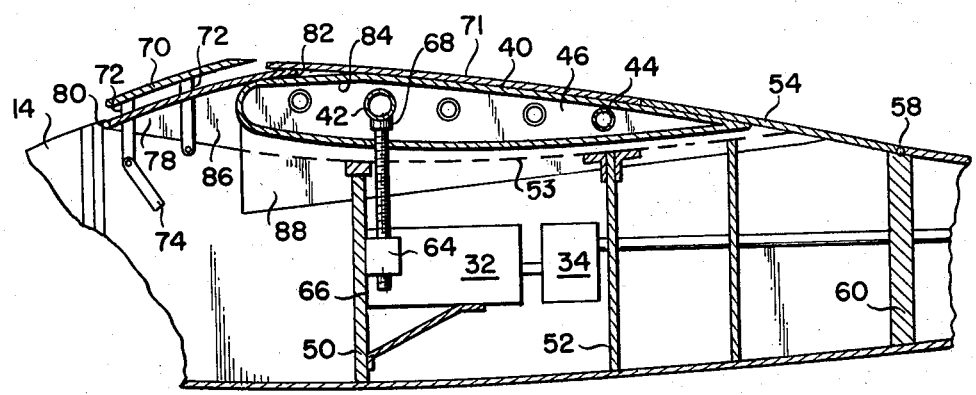
FIG. 7 is similar to FIG. 6, but with the wing angle of incidence increased.

As seen in FIGS. 6 and 7, an electric worm motor 64 for each screw 66 is rigidly secured to the bulkhead 50 on opposite sides thereof transversely of the fuselage and drivably receive the screws 66 to reciprocate the same vertically. At their ends the screws 66 are pivotally received within sockets 68 secured as by welding to main wing spar 42.

The aft hinge 58 and the two laterally spaced screws constitute the principal support and attachment for wing 40, and enables the same to be elevated to any incidence position between those shown in FIGS. 1 and 4 to achieve a desired angle of attack, fuselage attitude, or the like when not in high speed cruise.

The fuselage construction at the forward portion of the central section of wing 40 is composite and includes a normally collapsed vane 70 extending forwardly and aft of the wing leading edge. Vane 70 lies substantially flush with the upper skin at 71 of wing 40 and with the fuselage adjacent cockpit 14.

A plurality of links 72 (FIG. 6) pivotally support vane 70 and permit swinging movement of vane 70 from the FIGS. 1 or 6 position to the FIGS. 4 or 7 position whereat the same defines with the wing a slotted flap of limited transverse extent for enhancing low speed control of the aircraft.

In this regard, means such as a manual handle 74 may be provided in association with the links 72 to effect upward swinging movement of vane 70 when desired, the handle 74 being conveniently accessible from cockpit 14. A detent as at 76 may be provided to retain the flap in the FIG. 7 position in a positive manner. Obviously other means such as motors could be provided to operate vane 70.

In the normal retracted position of vane 70, the same constitutes in effect the upper exterior portion of the fuselage thereat and a portion of the wing upper surface. When elevated to the FIG. 7 position, a shield may be provided therebeneath at 78 so as to maintain the streamlined contour of the aircraft and not to disrupt air flow over the top surface panel of the wing in the fuselage area. The panel 78 serves this purpose and cooperates with vane 70 to provide the low speed control slot therebetween.

The panel 78 is hinged at its forward end 80 to a frame member of the fuselage while the trailing end 82 thereof lies in telescoped relation beneath the upper panel portion 71 of the wing and a relieved area 84 of the wing ribs in the central wing structure adjacent the fuselage. As clearly seen in FIGS. 6 and 7, when the wing is elevated about aft pivot 58 to increase the angle of incidence thereof, the panel 78 will be tilted upwardly therewith and will slide relatively forwardly from its fully telescoped position of FIG. 6. Panel 78 may be provided with narrow slots through which flap-actuated links 72 extend without significantly affecting the airfoil characteristics thereof.

Further, as the wing and panel 78 elevate, it is necessary to provide blockage against air ingress laterally of the fuselage so as to avoid disruption of air flow. To this end, the panel 78 may be provided with a pair of substantially triangular depending vanes 86 as seen in FIGS. 2 and 7, whereby when the panel is in its elevated position, the vanes 86 preclude lateral inflow and disruption of air flow over the wing. In like manner, the wing itself is provided with substantially larger depending triangular panels 88 which lie preferably just within the normal contours of the fuselage in suitable vertical recesses between the transverse bulkheads as at 50 and 52 and the outer skin of the aircraft.

As a consequence of the several vanes or panels 86, 88 or pairs of them, no large air-disrupting openings will be provided when the wing is elevated to the FIG. 4 or FIG. 7 position, whereby the airflow will remain generally smooth in the wing root area.

Figure 8:
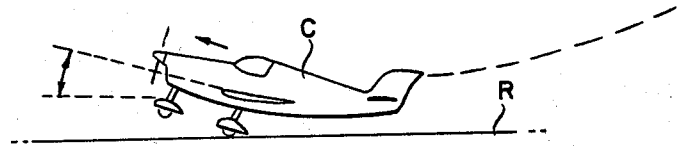
FIG. 8 is a diagrammatic illustration of a conventional aircraft indicating a usual attitude in approach, landing, and takeoff; and, FIG. 9 is a diagrammatic illustration of an aircraft according to the invention indicating the preferred attitude encountered during approach, landing, and takeoff.

In conventional aircraft having no variable wing incidence capability, such as the aircraft indicated at C, FIG. 8, the nose and entire fuselage of the aircraft must be angled upwardly in order to increase the wing angle of attack with respect to the relative wind in bleeding off airspeed approaching touchdown on runway R, for example. As a consequence, it will be seen that the pilot's view through the windscreen is directed at an upward angle, rather than forwardly down the runway during this relatively critical period.

The same relative conditions obtain to some extent during the immediately prior descent on the final approach path, as well as on takeoff.

Figure 9:
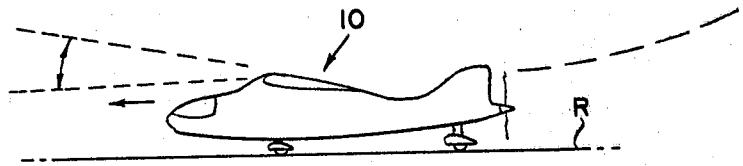

By contrast, an aircraft embodying the present invention as seen in FIG. 9 is enabled to land and take off in a substantially nose-level position. In both exemplary instances in FIGS. 8 and 9 it will be seen that the diagrammatically illustrated angle between the wing and a line parallel to runway R remains the same, but in FIG. 9 the fuselage of the aircraft is substantially parallel to the ground in a low speed, near-stalled condition for landing and with unobstructed forward vision to aid in a smooth landing, depth judgment, observation of conditions and possible hazards and the like.

Further, as noted hereinabove, the angled incidence condition of FIGS. 4 and 7 also increases the top airfoil wing area thereby providing improved lift and relatively low-speed controllability, in addition to that which may be further provided by conventional flaps or a leading edge slot at 70,78.

While in the drawings panel or shield 78 is shown as provided forwardly of the wing leading edge, the panel may be omitted entirely while still retaining vane 70 is desired.

With this arrangement, added lift and low speed control by virtue of the vane 70 disposed proximate the wing leading edge is retained. In this embodiment of the invention, and to avoid disruptive turbulence beneath the wing when in the elevated position of FIGS. 4 and 7, the seat area defined generally by arcuate dashed line 53 in FIG. 7 will be sheathed with metal so as to preclude obviously undesirable turbulent air flow within fuselage 12 as the wing is pivotally elevated from its relatively recessed position. Apertures provided in the sheathing permit operation of screws 66 or other lift means, as well as mounting of vane 70.

In this embodiment, the depending side panels 86 and 88 may be eliminated, as the metal paneling or sheathing at 53 prevents disruptive air flow within the fuselage. Optionally, ports or apertures are provided in panel 54 or laterally on the pair of depending panels 88 toward the rear thereof so as to permit exhaust of air passing beneath the center section of the wing and above the sheathing lying along line 98. It will be immediately appreciated that in this form of the invention substantially the entire central panel of the wing is employed for added lift when the wing is in elevated position. In the absence of the fairing panel 78, the telescoping slot therefor at 82 becomes unnecessary and the top of the wing central panel is smoothly contoured.

What I claim is:

1. An aircraft having a variable area, variable incidence wing comprising,
    a fuselage having an upwardly open recessed portion to receive therein a wing in high-wing position,
    a full-span wing extending on either side of said fuselage and having a central portion thereof received within said recessed portion,
    means mounting said wing for limited pivotal movement about a horizontal axis disposed aft of the wing trailing edge, said wing central portion having a panel extending therefrom aft of the wing trailing edge to said pivotal mounting means, thereby effectively extending the upper airfoil of the wing of said central portion at any pivoted angle, and,
    means disposed within the fuselage cooperatively associated with said wing for pivoting the wing about said axis relative to the line of thrust thereby to vary the wing incidence.

2. The aircraft of claim 1 wherein said fuselage is provided with an auxiliary panel horizontally hinged thereto forwardly of said wing leading edge, said panel having a telescoping interengagement with said wing central portion at all angles of said wing thereby effectively extending the upper airfoil surface of said wing central portion at any angle of incidence, and permitting said auxiliary panel to hinge upwardly and downwardly with like movement of said wing.

3. The aircraft of claim 2 wherein said wing pivoting means includes a member affixed to the wing main spar, and means for raising and lowering said member.

4. The aircraft of claim 2 wherein an airflow control vane is mounted in overlying relation to said auxiliary forward panel, and,
    means for shifting said vane into spaced relation to said panel, thereby to define a leading edge slot across said central portion for improved low speed control.

5. The aircraft of claim 2 wherein a pair of panels depend from said auxiliary panel adjacent either side of said fuselage thereby to preclude development of a lateral opening thereunder as said auxiliary panel hinges upwardly and downwardly.

6. The aircraft of claim 1 wherein a pair of panels depend from said central section adjacent either side of said fuselage thereby to maintain said fuselage recess covered as said wing is variably pivoted upwardly from its fully seated position.

7. The aircraft of claim 1 wherein said fuselage is sheathed at said recessed portion, whereby upon upward pivoting of said wing, the undersurface of said wing central portion and said sheathed fuselage portion define therebetween an area between which air may flow to enhance lift of said wing.

8. An aircraft having a variable area, variable incidence wing comprising
    a fuselage having an engine-driven pusher propeller at the aft end thereof,
    empennage adjacent the fuselage aft and including a vertical fin and rudder and an anhedral stabilizer elevator,
    a pair of wheels rotatably mounted upon the stabilizer at the extremities thereof,
    a single wheel disposed beneath the forward portion of the fuselage,
    a full-span wing,
    said fuselage having a recess upon the upper portion thereof for receiving said wing seated therein,
    means pivotally mounting said wing aft of its trailing edge to said fuselage for pivotal movement about a horizontal axis,
    said wing having a panel extending therefrom over the fuselage aft of the wing trailing edge to said pivotal mounting means, thereby effectively extending the upper airfoil of the wing over the fuselage at any pivoted angle, and
    means for pivoting said wing, thereby varying the incidence of said wing relative to the line of thrust, whereby the aircraft is enabled to maintain a substantially horizontal attitude at low speed upon landing.

9. The aircraft of claim 8 wherein said means for pivoting said wing comprises a motor-driven member affixed to the wing main spar and mounted for substantially vertical movement within the fuselage beneath the wing center section.

* * * * *